US010996735B2

(12) United States Patent
Scalf et al.

(10) Patent No.: US 10,996,735 B2
(45) Date of Patent: May 4, 2021

(54) POWER MANAGEMENT SYSTEM

(71) Applicant: Hygge Power Inc., Boulder, CO (US)

(72) Inventors: Caleb Tristan Scalf, Bolder, CO (US); David Pierre Delcourt, Boulder, CO (US); Maxwell Michael Lewin, Broomfield, CO (US); Mark Richard Shamley, Broomfield, CO (US); Mark Nickolas Mietus, Boulder, CO (US)

(73) Assignee: Hygge Power Inc., Boulder, CO (US)

( * ) Notice: Subject to any disclaimer, the term of this patent is extended or adjusted under 35 U.S.C. 154(b) by 0 days.

(21) Appl. No.: 16/028,223

(22) Filed: Jul. 5, 2018

(65) Prior Publication Data

US 2019/0018473 A1 Jan. 17, 2019

Related U.S. Application Data

(60) Provisional application No. 62/532,339, filed on Jul. 13, 2017.

(51) Int. Cl.
| | |
|---|---|
| *G06F 1/3212* | (2019.01) |
| *G05F 1/66* | (2006.01) |
| *G06Q 10/04* | (2012.01) |
| *H04L 12/28* | (2006.01) |

(Continued)

(52) U.S. Cl.
CPC ............. *G06F 1/3212* (2013.01); *G05F 1/66* (2013.01); *G06Q 10/04* (2013.01); *H02J 3/14* (2013.01); *H02J 13/0062* (2013.01); *H02J 13/0075* (2013.01); *H02J 13/0079* (2013.01);

(Continued)

(58) Field of Classification Search
CPC ................ H02J 9/00–18; Y10T 307/62; Y10T 307/615; Y10T 307/625; Y10T 307/263; G06F 1/3212
See application file for complete search history.

(56) References Cited

U.S. PATENT DOCUMENTS

| | | | |
|---|---|---|---|
| 7,429,806 B2 * | 9/2008 | Bainbridge | ............... G06F 1/26 307/52 |
| 7,519,909 B2 * | 4/2009 | Kuiawa | ............... G06F 3/04817 715/734 |

(Continued)

FOREIGN PATENT DOCUMENTS

WO WO-9401908 A1 * 1/1994 ......... H01R 13/6666

*Primary Examiner* — Brian T Misiura
(74) *Attorney, Agent, or Firm* — VLP Law Group LLP; Michel Bohn

(57) ABSTRACT

Methods, systems, and devices for managing a power system are described. A power management system may include multiple interconnected power supply and control units that plug directly into a standard residential power outlet. A power management system may include multiple interconnected power supply and control units that plug directly into a standard residential power outlet. Together, the interconnected power supply and control units may provide a distributed power backup system in the form of a home energy nano-grid. The power management system may provide backup power, power sharing, and device inter-connectivity while enabling efficient scalability and the robustness of a distributed system. The power management system may also include a power usage monitoring unit, which may gather data and use it to improve the efficiency of power usage throughout the home.

19 Claims, 9 Drawing Sheets

(51) Int. Cl.
*H02J 13/00* (2006.01)
*H02J 3/14* (2006.01)

(52) U.S. Cl.
CPC ...... *H04L 12/2803* (2013.01); *H02J 2310/14* (2020.01); *H02J 2310/64* (2020.01)

(56) References Cited

U.S. PATENT DOCUMENTS

| | | | | |
|---|---|---|---|---|
| 7,961,111 B2* | 6/2011 | Tinaphong | ............ | H02H 9/042 |
| | | | | 340/638 |
| 8,412,387 B2* | 4/2013 | Park | ...................... | G06Q 50/06 |
| | | | | 700/297 |
| 8,674,823 B1* | 3/2014 | Contario | .................. | H02J 1/10 |
| | | | | 340/333 |
| 8,754,544 B2* | 6/2014 | Colombi | ................ | H02J 3/005 |
| | | | | 307/64 |
| 9,432,159 B2* | 8/2016 | Ratasuk | ........... | H04W 72/1226 |
| 9,684,349 B2* | 6/2017 | Fallon | ....................... | G06F 1/26 |
| 9,703,342 B2* | 7/2017 | Nicholson | ............... | H04L 12/10 |
| 9,727,898 B2* | 8/2017 | Park | ...................... | G06Q 30/04 |
| 9,769,948 B2* | 9/2017 | Welch, Jr. | ............. | H05K 7/1492 |
| 9,929,591 B2* | 3/2018 | Cheng | ...................... | H02J 9/061 |
| 9,940,801 B2* | 4/2018 | Phillips | ................... | H04L 67/12 |
| 10,097,034 B2* | 10/2018 | Hsieh | ................... | G01R 31/382 |
| 10,432,017 B1* | 10/2019 | Morales | ................. | H02J 9/061 |
| 2003/0033548 A1* | 2/2003 | Kuiawa | ................... | G06F 1/263 |
| | | | | 713/300 |
| 2011/0196547 A1 | 8/2011 | Park et al. | | |
| 2012/0005126 A1* | 1/2012 | Oh | ........................... | H02J 3/14 |
| | | | | 705/412 |
| 2013/0049466 A1* | 2/2013 | Adams | .................... | G06F 1/266 |
| | | | | 307/39 |
| 2014/0266669 A1 | 9/2014 | Fadell et al. | | |
| 2014/0379160 A1* | 12/2014 | Fallon | .................... | H02J 9/062 |
| | | | | 700/297 |
| 2016/0172902 A1* | 6/2016 | Battat | ................... | H02J 7/0024 |
| | | | | 307/65 |
| 2016/0329710 A1 | 11/2016 | Clifton | | |
| 2017/0139466 A1* | 5/2017 | Grimes | ................. | G06F 1/3287 |
| 2017/0177066 A1* | 6/2017 | Linder | ................... | G06F 1/3287 |
| 2018/0253952 A1* | 9/2018 | Huang | ............... | H04L 12/2825 |

* cited by examiner

POWER MANAGEMENT SYSTEM

CROSS-REFERENCE TO RELATED APPLICATION

This application claims priority to, and the benefit of, U.S. Provisional Application Ser. No. 62/532,339 filed on Jul. 13, 2017, entitled 'POWER MANAGEMENT SYSTEM'. The entire contents of the foregoing application are hereby incorporated by reference for all purposes.

BACKGROUND

The following relates generally to power management, and more specifically to managing the power system of a building (e.g., as a component of a home automation system).

Home automation may allow a user to monitor and control functions of a residence. A residence in which automation may be controlled by a user remotely may be referred to as a smart home. Smart homes may enable automation of multiple systems, which may include lighting, HVAC, security, appliances, and others. A smart home may automate blinds, lights, and lamps. Additionally, a smart home may allow user control of systems such doors, temperature, security components, and others remotely. Smart homes may enable energy savings for a user. HVAC systems may have customizable schedules for heating and cooling. Automation of heat and lighting may allow users to reduce their usage while the user is away. Additionally, smart homes may prevent or mitigate damage to the home. Sensors to detect water leaks or other hazards in a home may enable systems to stop damage before it happens. Smart homes may be built on a variety of protocols, each of which may suitable for different devices or functions.

Some buildings, including some smart homes be subject to unpredictable power supply, power shocks, loss of power, or time varying energy pricing. This may result in lost efficiency, data loss or damage to electronic devices.

SUMMARY

A power management system may include multiple interconnected power supply and control units that plug directly into a standard residential power outlet. In one embodiment, each unit may include an uninterrupted power supply (UPS) unit comprising a battery management system and battery; a microprocessor unit (MCU), a communication unit operable to communicate over a wireless network, a local area network, or both, a power usage monitoring unit; and an energy optimization unit operable to determine power settings based on data received from an external source.

A method of manufacturing a device for power management is described. The method may include providing an UPS unit comprising a battery management system and battery; an MCU, a communication unit operable to communicate over a wireless network, a local area network, or both, a power usage monitoring unit; and an energy optimization unit operable to determine power settings based on data received from an external source.

Some examples of the UPS system described above may also include a battery management unit. Some examples of the UPS system described above may also include a battery. In some examples of the UPS system described above, the battery may be a Lithium-Ion battery. In some examples of the UPS system described above, the power supply comprises a UPS. Some examples of the UPS system described above may also include a power plug configured to draw power from and secure the apparatus to a standard wall power receptacle.

In some examples of the UPS system described above, the power plug may be a National Electrical Manufacturers Association (NEMA) 5-15 power plug. In some examples of the UPS system described above, the power plug may be capable of connecting to an NEC compliant outlet capable of fitting a NEMA certified receptacle.

Some examples of the UPS system described above may also include an electrical extension cord. In some examples of the UPS system described above, the electrical extension cord enables the apparatus to be conveniently located at a distance from an outlet.

In some examples of the UPS system described above, the communication unit comprises a wireless local area network (WLAN) radio. Some examples of the UPS system described above may also include an AC power output. Some examples of the UPS system described above may also include an AC to AC power supply.

Some examples of the UPS system described above may also include a DC power output. Some examples of the UPS system described above may also include a DC to DC power supply. Some examples of the UPS system described above may also include an AC to DC power supply. Some examples of the UPS system described above may also include a power selection unit.

In some examples of the UPS system described above, the power selection unit may be operable to prioritize an AC power output or a DC power output based on a configuration. In some examples of the UPS system described above, the lighting unit comprises a light emitting diode (LED) light source. Some examples of the UPS system described above may also include a microphone. Some examples of the UPS system described above may also include a speaker unit.

Some examples of the UPS system described above may also include a power usage monitoring unit. Some examples of the UPS system described above may also include an energy optimization unit. Some examples of the UPS system described above may also include an inter-UPS communication unit.

In some examples of the UPS system described above, the inter-UPS communication unit may be operable to communicate with itself, another UPS system, a user, a mobile device, a web application, or any combination thereof. In some examples of the UPS system described above, the communication unit may be operable to communicate over a wireless network, a local area network, or both.

In some examples of the UPS system described above, the communication unit comprises a cloud communication unit. In some examples of the UPS system described above, the cloud communication unit may be operable to send or receive messages to a mobile device, web application, voice control device, or any combination thereof.

Some examples of the UPS system described above may also include a light source. Some examples of the UPS system described above may also include a powerline sensing unit. Some examples of the UPS system described above may also include a powerline communications unit.

Some examples of the UPS system described above may also include a temperature sensor. Some examples of the UPS system described above may also include a humidity sensor. Some examples of the UPS system described above may also include an HVAC communications component operable to communicate information from the temperature sensor and the humidity sensor to an HVAC system.

Some examples of the UPS system described above may also include a universal serial bus (USB) port. Some examples of the UPS system described above may also include an energy optimization unit operable to determine power settings based on time varying pricing data, tiered pricing data, power usage history, user behavior data, or any combination thereof. Some examples of the UPS system described above may also include a power configuration unit operable to modify energy intake through the power plug and output through the power receptacle based at least in part on parameters determined by the energy optimization unit. In some cases, the power configuration unit may be a component of a UPS.

Some examples of the UPS system described above may also include a housing. Some examples of the UPS system described above may also include a faceplate. Some examples of the UPS system described above may also include a power receptacle. Some examples of the UPS system described above may also include a receptacle connector. Some examples of the UPS system described above may also include an electrical box configured to secure the apparatus within an interior of a wall.

In some examples of the UPS system described above, the power receptacle comprises a NEMA 5-15 power receptacle. In some examples of the UPS system described above, the receptacle connector comprises a NEMA certified connector. In some examples of the UPS system described above, the electrical box comprises an NEC article 314 compliant box.

Some examples of the UPS system described above may also include a fire-safety battery management component. Some examples of the UPS system described above may also include a power sharing component operable to manage sharing of power with other UPS devices. Some examples of the UPS system described above may also include a surge protection unit. Some examples of the UPS system described above may also include a security configuration unit.

In some examples of the UPS system described above, the security configuration unit may be configurable for a plurality of modes including an away mode, a present mode, a night mode, a daytime mode, a pet mode or any combination thereof. In some examples of the UPS system described above, the away mode comprises a motion sensing alert function. In some examples of the UPS system described above, the night mode comprises an audible alarm function.

Some examples of the UPS system described above may also include an automated alert component operable to trigger an alert based on user configured settings. Some examples of the UPS system described above may also include a behavioral learning unit operable to monitor user behavior patterns and update a configuration of the security configuration unit. Some examples of the UPS system described above may also include an external motion sensing unit. Some examples of the UPS system described above may also include an external security camera.

Some examples of the UPS system described above may also include an speaker/microphone. In some examples of the UPS system described above, the speaker/microphone may be operable to be triggered by the motion sensing unit, a microphone, or both.

Some examples of the UPS system described above may also include an emergency lighting alarm. In some examples of the UPS system described above, the emergency lighting alarm may be operable to be triggered by the motion sensing unit, a microphone, or both. Some examples of the UPS system described above may also include a light source. Some examples of the UPS system described above may also include a surge protection unit. Some examples of the UPS system described above may also include a brownout protection unit.

Some examples of the UPS system described above may also include a power outage protection unit. Some examples of the UPS system described above may also include a security communications unit operable to communicate with an external security service. Some examples of the UPS system described above may also include a power plug. Some examples of the UPS system described above may also include a power receptacle. Some examples of the UPS system described above may also include a power storage unit. In some examples of the UPS system described above, the power plug comprises a NEMA 5-15 power plug.

In some examples of the UPS system described above, the power receptacle comprises a NEMA 5-15 power receptacle. In some examples of the UPS system described above, the power plug may be capable of being connected directly to a National Electrical Code compliant outlet capable of fitting a NEMA certified receptacle.

In one embodiment, a power management system may include a plurality of power supply and control units in electronic communication with each other, a power usage monitoring unit, and an energy optimization unit.

A method of making a device for power management is described. The method may include providing a plurality of power supply and control units in electronic communication with each other, providing a power usage monitoring unit, and providing an energy optimization unit. A method of power management is described. The method may include using a plurality of power supply and control units in electronic communication with each other, using a power usage monitoring unit, and using an energy optimization unit.

In some examples of the power management system described above, each of the plurality of power supply and control units may be connected to a power outlet, and may be in electronic communication with the other power supply and control units via the power outlet. In some examples of the power management system described above, the power outlet may be a NEMA 5-15 power outlet. In some examples of the power management system described above, the power usage monitoring unit may be collocated with a power supply and control unit. In some examples of the power management system described above, the energy optimization unit may be collocated with a power supply and control unit.

In some examples of the power management system described above, the apparatus may be in communication with a smart home device. In some examples of the power management system described above, the smart home device comprises an Amazon Alexa unit, an Amazon Echo unit, a Google Home unit, an Apple Homekit device, a Wink Hub device, a Logitech Harmony device, a Netgear Arlo device, a Nest device, an Ecobee device, a Philips lighting device, a refrigeration device, a home security device, or any combination thereof.

In some examples of the power management system described above, each of the power supply and control units comprises a communication unit and may be capable of wireless or wired communication with other power supply and control units. In some examples of the power management system described above, the communication unit operates according to a Wi-fi protocol, a Zigbee protocol, a Bluetooth protocol, a Z-Wave protocol, an Insteon protocol, a thread protocol, an Apple Homekit protocol, or any combination thereof.

Some examples of the power management system described above may also include a home security unit. Some examples of the power management system described above may also include a motion sensor monitoring unit. Some examples of the power management system described above may also include a light source configuration unit. In some examples of the power management system described above, the light source configuration unit may be operable to configure a light source based on a time of day, a user mode, a machine learning algorithm, or any combination thereof.

Some examples of the power management system described above may also include an outlet power management unit. Some examples of the power management system described above may also include a behavioral battery unit. In some examples of the power management system described above, the energy optimization unit may be configurable according to a plurality of user preference modes, the plurality of user preference modes including a cost saving mode, a user comfort mode, a maximum power availability mode, or any combination thereof.

In one embodiment, a method may include monitoring power usage data of a building using a plurality of UPS systems within the building, transmitting the power usage data to a server or data storage unit, receiving an energy usage configuration based at least in part on transmitting the power usage data, and configuring at least one of the plurality of UPS systems based on the energy usage configuration.

In one embodiment, a non-transitory computer-readable medium may include instructions operable to cause a processor to monitor power usage data of a building using a plurality of UPS systems within the building, transmit the power usage data to a server or data storage unit, receive an energy usage configuration based at least in part on transmitting the power usage data, and configure at least one of the plurality of UPS systems based on the energy usage configuration.

In one embodiment, an apparatus may include a processor, memory in electronic communication with the processor, and instructions stored in the memory. The instructions may be operable to cause the processor to monitor power usage data of a building using a plurality of UPS systems within the building, transmit the power usage data to a server or data storage unit, receive an energy usage configuration based at least in part on transmitting the power usage data, and configure at least one of the plurality of UPS systems based on the energy usage configuration.

In one embodiment, an apparatus may include means for monitoring power usage data of a building using a plurality of UPS systems within the building, means for transmitting the power usage data to a server or data storage unit, means for receiving an energy usage configuration based at least in part on transmitting the power usage data, and means for configuring at least one of the plurality of UPS systems based on the energy usage configuration. In some examples of the method, non-transitory computer-readable medium, and apparatus described above, the energy usage configuration may be based on time varying energy price data, tiered energy price data, user behavioral patterns, or any combination thereof.

Some examples of the method, non-transitory computer-readable medium, and apparatus described above may further include processes, features, means, or instructions for identifying weather information, wherein the configuring may be based on the weather information. Some examples of the method, non-transitory computer-readable medium, and apparatus described above may further include processes, features, means, or instructions for identifying a user preference mode from a plurality of user preference modes, the plurality of user preference modes including a cost saving mode, a user comfort mode, a maximum power availability mode, or any combination thereof, wherein the configuring may be based on the user preference mode.

DETAILED DESCRIPTION

A power management system may include multiple interconnected power supply and control units that plug directly into a standard residential power outlet. Together, the interconnected power supply and control units may provide a distributed power backup system in the form of a home energy nano-grid.

The in-power management system may provide backup power, power sharing, and device inter-connectivity while enabling efficient scalability and the robustness of a distributed system. The power management system may also include a power usage monitoring unit, which may gather data and use it to improve the efficiency of power usage throughout the home. For example, the data may enable a machine learning function to adapt to the behavior of residents occupying the home. In some cases, the data may be utilized by a cloud computing platform to achieve additional comfort, energy savings, and security benefits.

The power usage monitoring system may therefore identify usage patterns involving multiple power supply and control units. In some cases, the usage patterns may be used together with time variable pricing data to reduce energy costs. Energy may be stored and then discharged when the current price from the utility exceeds the cost paid for the energy at the time of storage. Thus, the power management system may function as a smart sub-storage energy market where electrical grid demand can be offset by stored energy discharge at certain periods during the day via external cloud connected inputs, or programmable code embedded in the devices.

Figure 1:
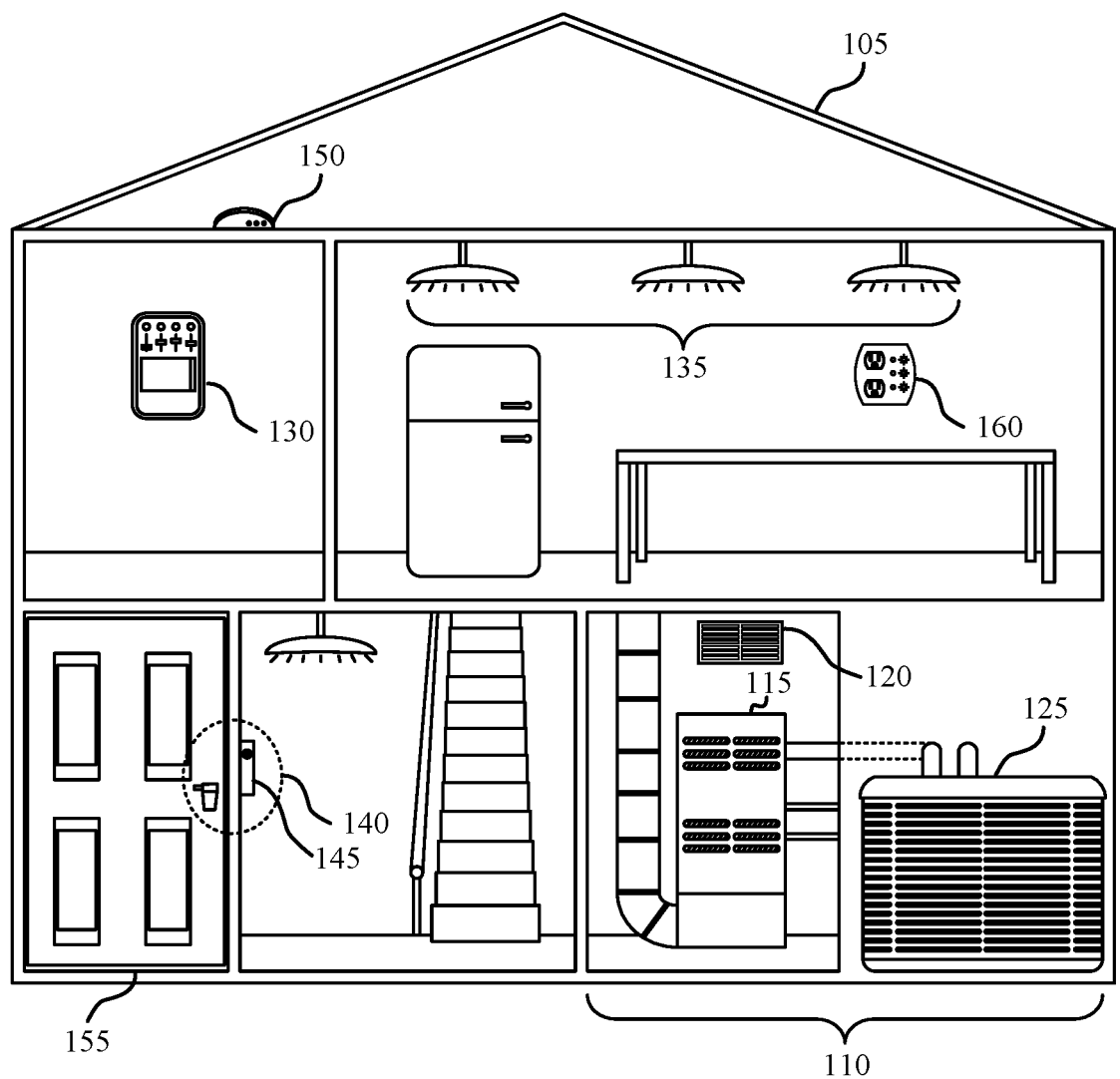
FIG. 1 shows a smart home that supports managing a power system in accordance with aspects of the present disclosure.

FIG. 1 shows a smart home 100 that supports managing a power system in accordance with aspects of the present disclosure. A smart home may include the following components: building 105, HVAC 110, controller 130, lighting 135, security system 140, hazard sensor 150, door 155, and power supply and control unit 160. In some cases, smart home 100 may prevent or mitigate damage to the home or home electronics using one or more power supply and control unit 160. Sensors to detect water leaks or other hazards in a home may also enable systems to stop damage before it happens.

In some examples, HVAC 110 may include the following components: heating 115, ventilation 120, and air conditioning 125. HVAC 110 systems may have customizable schedules for heating 115 and air conditioning 125. In some examples, security system 140 may include one or more security components 145, such as security cameras, motion sensors, door or window sensors, or the like.

Figure 2:
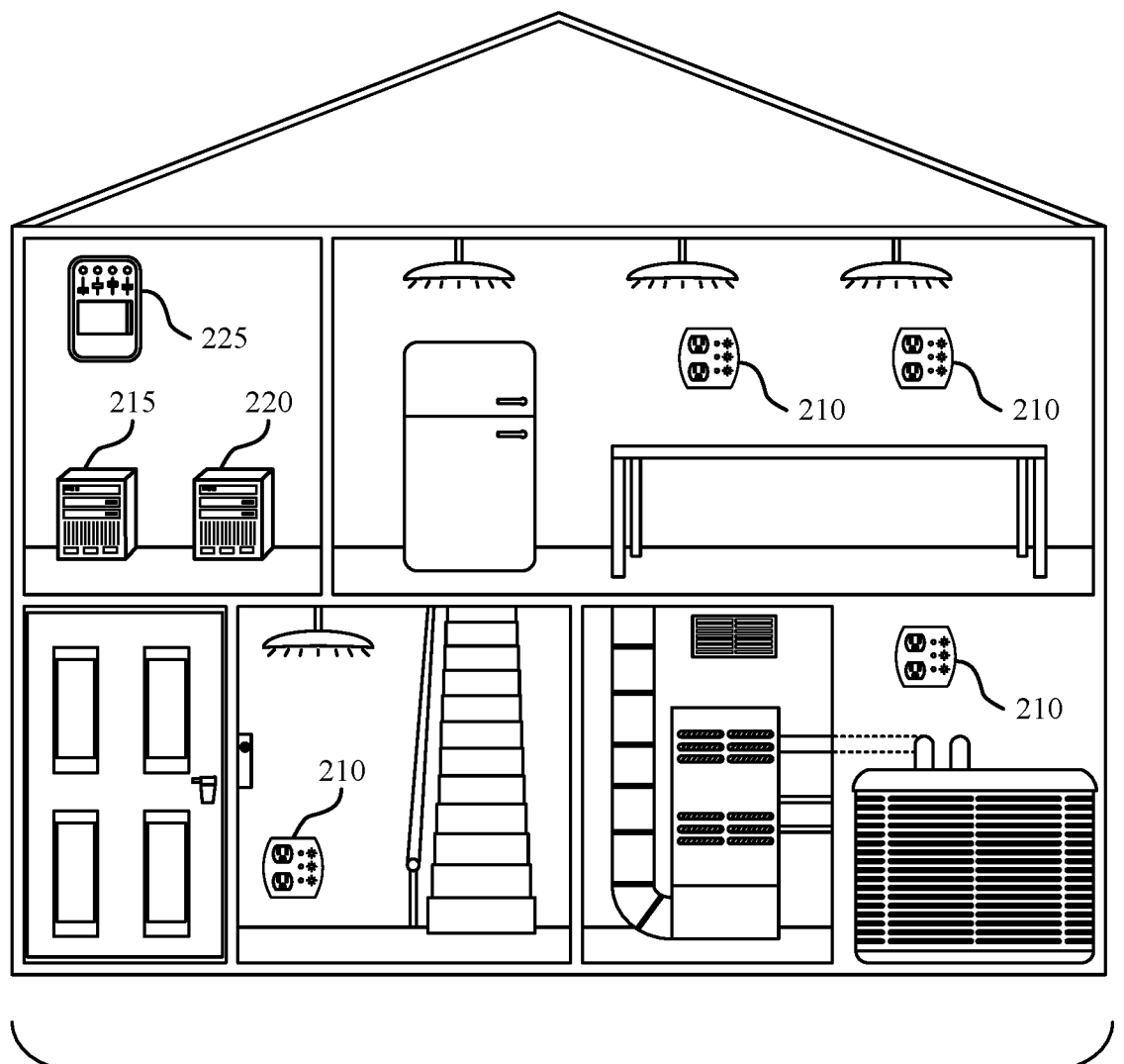
FIGS. 2 through 6 show diagrams that support managing a power system in accordance with aspects of the present disclosure.

FIG. 2 shows a diagram 200 that supports managing a power system in accordance with aspects of the present disclosure. Diagram 200 may include power management system 205. In some examples, power management system 205 may include the following components: power supply and control unit 210, power usage monitoring unit 215, energy optimization unit 220, and one or more smart home devices 225. In some cases, power usage monitoring unit 215, energy optimization unit 220 may be collocated with a power supply and control unit 210. In some examples, energy optimization unit 220 may be a component of power supply and control unit 210.

A power management system 205 may include multiple interconnected power supply and control units 210 that plug directly into a standard residential power outlet. In some cases, the power management system 205 is in communication with a smart home device 225 such as those described above with reference to FIG. 1. Together, the interconnected power supply and control units 210 may form a distributed power backup system in the form of a home energy nano-grid.

Thus, the power management system 205 may provide backup power, power sharing, and device inter-connectivity while enabling efficient scalability and the robustness of a distributed system. The power management system 205 may also include a power usage monitoring unit 215, which may gather data and use it to improve the efficiency of power usage throughout the home. For example, the data may enable a machine learning function to adapt to the behavior of residents occupying the home. In some cases, the data may be utilized by a server (e.g., a local server or a cloud computing platform) to achieve additional comfort, energy savings, and security benefits.

The power usage monitoring system may identify usage patterns involving multiple power supply and control units 210. In some cases, the usage patterns may be used together with time variable pricing data to reduce energy costs. Energy may be stored and then discharged when the current price from the utility exceeds the cost paid for the energy at the time of storage.

Thus, the power management system 205 may function as a smart sub-storage energy market where electrical grid demand can be offset by stored energy discharge at certain periods during the day via external connected inputs, or programmable code embedded in the devices.

Power supply and control unit 210 may be an example of a plurality of components in electronic communication with each other. In some cases, each of the plurality of power supply and control units 210 is connected to a power outlet, and is in electronic communication with the other power supply and control units 210 via the power outlet. In some cases, the power outlet is a National Electrical Manufacturers Association (NEMA) 5-15 power outlet. In some cases, each of the power supply and control units 210 comprises a communication unit and is capable of wireless or wired communication with other power supply and control units 210. In some cases, the communication unit operates according to a Wi-fi protocol, a Zigbee protocol, a Bluetooth protocol, a Z-Wave protocol, an Insteon protocol, a thread protocol, an Apple Homekit protocol, or any combination thereof.

Power usage monitoring unit 215 may be an example of a component of uninterrupted power supply (UPS) system; be an example of a component of power management system 205; and monitor power usage data of a building using a plurality of UPS systems within the building. In some cases, the power usage monitoring unit 215 is collocated with a power supply and control unit 210.

Energy optimization unit 220 may be an example of a component of UPS system; be an example of a component of power management system 205; and identify a user preference mode from a plurality of user preference modes, the plurality of user preference modes including a cost saving mode, a user comfort mode, a maximum power availability mode, or any combination thereof, wherein the configuring is based on the user preference mode.

In some cases, the energy optimization unit 220 is collocated with a power supply and control unit 210. In some cases, the energy optimization unit 220 is configurable according to a plurality of user preference modes, the plurality of user preference modes including a cost saving mode, a user comfort mode, a maximum power availability mode, or any combination thereof.

In some cases, the smart home device 225 comprises an Amazon Alexa unit, an Amazon Echo unit, a Google Home unit, an Apple Homekit device, a Wink Hub device, a Logitech Harmony device, a Netgear Arlo device, a Nest device, an Ecobee device, a Philips lighting device, a refrigeration device, a home security device, or any combination thereof.

Figure 3:
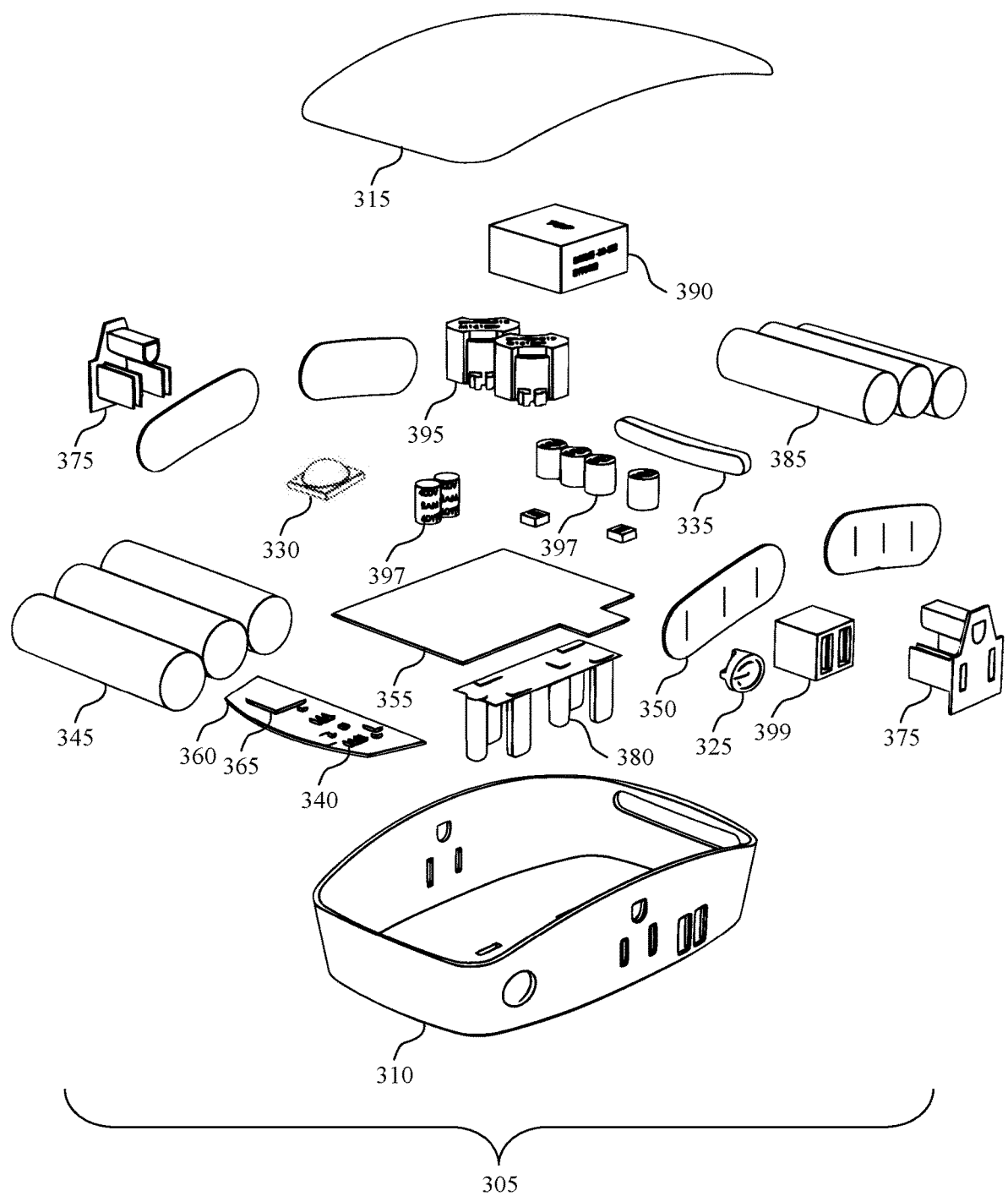

FIG. 3 shows a diagram 300 that supports managing a power system in accordance with aspects of the present disclosure. Diagram 300 may include UPS system 305. UPS system 305 may be an example of a power supply and control unit described with reference to FIGS. 1 and 2, or the corresponding UPS systems described with reference to FIGS. 4, 5, and 6.

In some examples, UPS system 305 may include the following components: housing 310, faceplate 315, indicator 320, multi-function button 325, motion sensing unit 330, lighting unit 335, communication unit 340, battery 345, battery management unit 350, analog circuit board 355, digital control board 360, microprocessor unit (MCU) 365, DC power output (not shown), AC power output 375, power plug 380, power supply 385, inverter 390, transformer 395, capacitors 397, and universal serial bus (USB) port 399.

Housing 310 may be an example of a component of UPS system 305. Faceplate 315 may be an example of a component of UPS system 305. Indicator 320 may be an example of the corresponding components of the same name described with reference to FIGS. 4, 5, and 6. Multi-function button 325 may be an example of the corresponding components of the same name described with reference to FIGS. 4, 5, and 6.

Motion sensing unit 330 may be an example of a component of UPS system 305. Motion sensing unit 330 may be an example of the corresponding components of the same name described with reference to FIGS. 4, 5, and 6. Lighting unit 335 may be an example of a component of UPS system 305. Lighting unit 335 may be an example of the corresponding components of the same name described with reference to FIGS. 4, 5, and 6. In some cases, the lighting unit 335 comprises a light emitting diode (LED) light source.

Communication unit 340 may be an example of a component of UPS system 305; transmit the power usage data to a server or data storage unit; and receive an energy usage configuration based at least in part on transmitting the power usage data. Communication unit 340 may be an example of the corresponding components of the same name described with reference to FIGS. 4, 5, and 6.

In some cases, the communication unit 340 comprises a wireless local area network (WLAN) radio. In some cases, the communication unit 340 is operable to communicate over a wireless network, a local area network, or both. In some cases, the communication unit 340 comprises a cloud communication unit.

Battery 345 may be an example of a component of UPS system 305. Battery 345 may be a device that stores and discharges energy through the controlled conversion of chemical energy to electric energy. Energy is stored by preventing the flow of electrons between chemical reactants with different electric potential. Energy is released when electrons are allowed to flow between a positive terminal (cathode) and a negative terminal (anode). When the terminals are connected, the compounds undergo chemical reactions that are known as oxidation and reduction. The chemical reactions may cause a flow of electrolytes and drive current through a circuit to power UPS system 305. Batteries may be classified by the type of electrochemical cells that contain the chemical reactants. Cell types include galvanic cells, electrolytic cells, fuel cells, flow cells, saltwater cells, molten salt cells, and voltaic piles. These cells may use a liquid electrolyte (wet cell) or a low-moisture paste (dry cell). Battery 345 may be either single-use (primary) and rechargeable (secondary).

Battery 345 may be an example of the corresponding components of the same name described with reference to FIGS. 4, 5, and 6. Battery management unit 350 may be an example of a component of UPS system 305. Battery management unit 350 may be an example of the corresponding components of the same name described with reference to FIGS. 4, 5, and 6.

MCU 365 may be an example of a component of UPS system 305. MCU 365 may be an example of the corresponding components of the same name described with reference to FIGS. 4, 5, and 6.

A DC power output may be an example of a component of UPS system 305. The DC power output may be an example of the corresponding components of the same name described with reference to FIG. 4. AC power output 375 may be an example of a component of UPS system 305. AC power output 375 may be an example of the corresponding components of the same name described with reference to FIG. 4.

Power plug 380 may be an example of a component of UPS system 305. Power plug 380 may be an example of the corresponding components of the same name described with reference to FIGS. 4, 5, and 6. In some cases, the power plug 380 is a NEMA 5-15 power plug 380. In some cases, the power plug 380 is capable of connecting to an NEC compliant outlet capable of fitting a NEMA certified receptacle. In some cases, the power plug 380 comprises a NEMA 5-15 power plug 380. In some cases, the power plug 380 is capable of being connected directly to a National Electrical Code compliant outlet capable of fitting a NEMA certified receptacle.

Power supply 385 may be an example of a component of UPS system 305. Power supply 385 may be an example of the corresponding components of the same name described with reference to FIGS. 4, 5, and 6. In some cases, the power supply 385 comprises a UPS.

Figure 4:
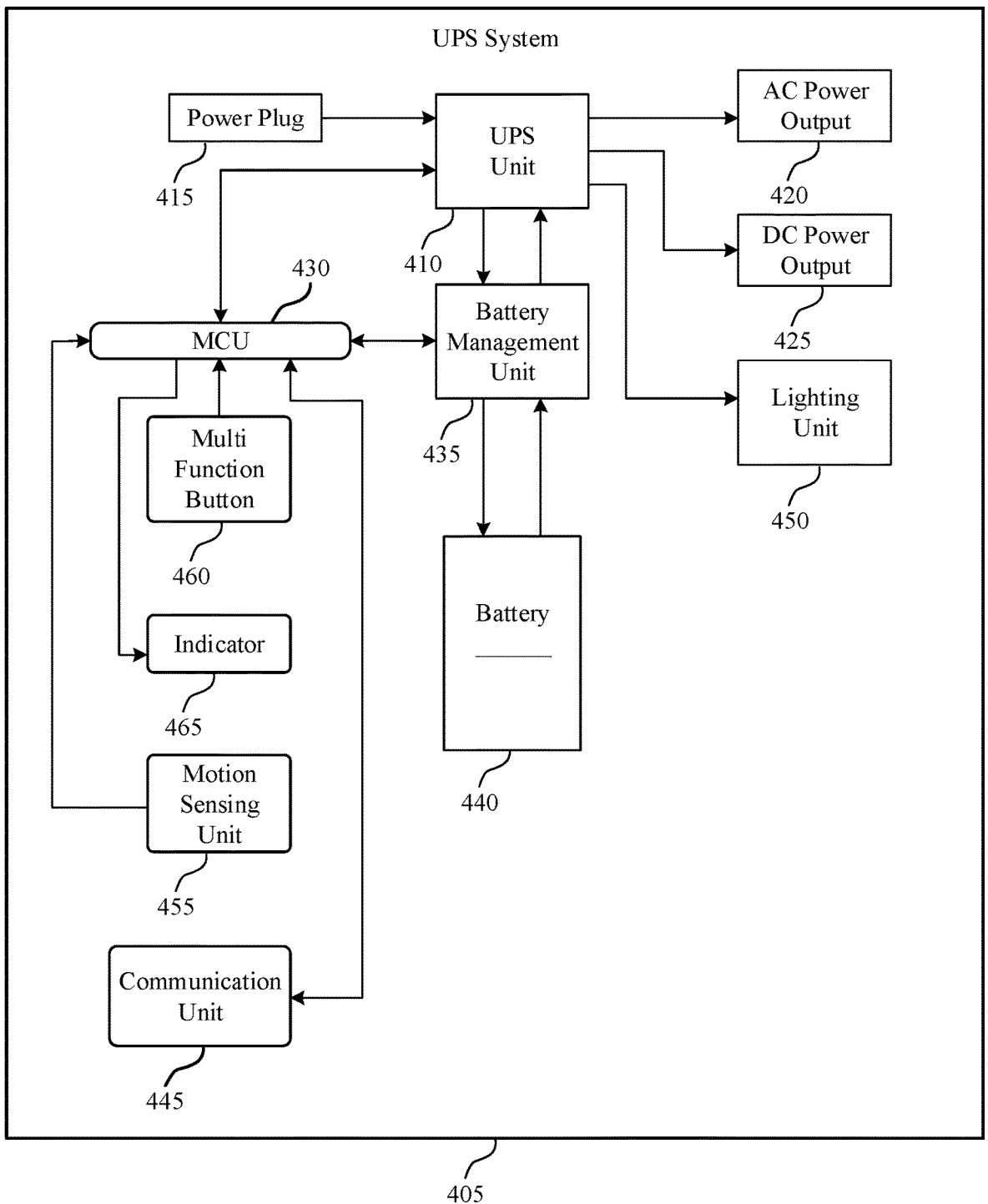

FIG. 4 shows a diagram 400 that supports managing a power system in accordance with aspects of the present disclosure. Diagram 400 may include UPS system 405. UPS system 405 may be an example of the corresponding components of the same name described with reference to FIGS. 3, 5, and 6. In some examples, UPS system 405 may include the following components: power supply 410, power plug 415, AC power output 420, DC power output 425, MCU 430, battery management unit 435, battery 440, communication unit 445, lighting unit 450, motion sensing unit 455, multi-function button 460, and indicator 465.

Power supply 410 may be an example of a component of UPS system 405. Power supply 410 may be an example of the corresponding components of the same name described with reference to FIGS. 3, 5, and 6. Power plug 415 may be an example of a component of UPS system 405. Power plug 415 may be an example of the corresponding components of the same name described with reference to FIGS. 3, 5, and 6.

AC power output 420 may be an example of a component of UPS system 405. AC power output 420 may be an example of the corresponding components of the same name described with reference to FIG. 3. DC power output 425 may be an example of a component of UPS system 405. DC power output 425 may be an example of the corresponding components of the same name described with reference to FIG. 3.

MCU 430 may be an example of a component of UPS system 405. MCU 430 may be an example of the corresponding components of the same name described with reference to FIGS. 3, 5, and 6.

Battery management unit 435 may be an example of a component of UPS system 405. Battery management unit 435 may be an example of the corresponding components of the same name described with reference to FIGS. 3, 5, and 6. Battery 440 may be an example of a component of UPS system 405. Battery 440 may be an example of the corresponding components of the same name described with reference to FIGS. 3, 5, and 6.

Communication unit 445 may be an example of a component of UPS system 405; transmit the power usage data to a server or data storage unit; and receive an energy usage configuration based at least in part on transmitting the power usage data. Communication unit 445 may be an example of the corresponding components of the same name described with reference to FIGS. 3, 5, and 6.

In some examples, communication unit 445 may include a transceiver. A transceiver may communicate bi-directionally, via antennas, wired, or wireless links as described above. For example, the transceiver may represent a wireless transceiver and may communicate bi-directionally with another wireless transceiver. The transceiver may also include or be connected to a modem to modulate the packets and provide the modulated packets to for transmission, and to demodulate received packets. In some examples, transceiver may be tuned to operate at specified frequencies. For example, a modem can configure the transceiver to operate at a specified frequency and power level based on the communication protocol used by modem.

Lighting unit 450 may be an example of a component of UPS system 405. Lighting unit 450 may be an example of the corresponding components of the same name described with reference to FIGS. 3, 5, and 6. Motion sensing unit 455 may be an example of a component of UPS system 405. Motion sensing unit 455 may be an example of the corresponding components of the same name described with reference to FIGS. 3, 5, and 6.

Multi-function button 460 may be an example of the corresponding components of the same name described with reference to FIGS. 3, 5, and 6. Indicator 465 may be an example of the corresponding components of the same name described with reference to FIGS. 3, 5, and 6.

Figure 5:
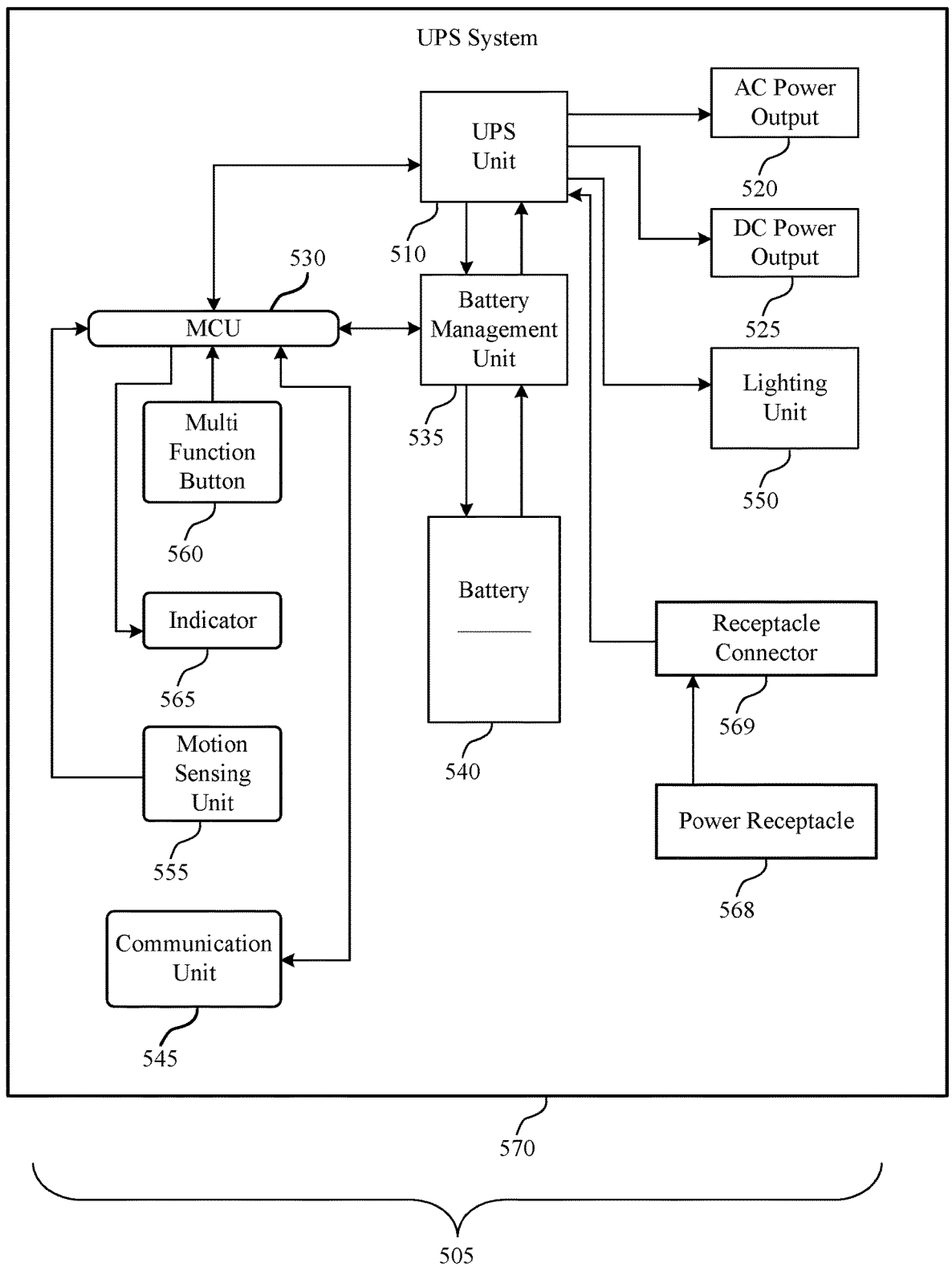

FIG. 5 shows a diagram 500 that supports managing a power system in accordance with aspects of the present disclosure. Diagram 500 may include UPS system 505. UPS system 505 may be an example of the corresponding components of the same name described with reference to FIGS. 3, 4, and 6. In some examples, UPS system 505 may include the following components: power supply 510, AC power output 520, DC power output 525, MCU 530, battery management unit 535, battery 540, communication unit 545, motion sensing unit 555, lighting unit 550, multi-function button 560, indicator 565, power receptacle 568, receptacle connector 569, and electrical box 570. Power supply 510 may be an example of a component of UPS system 505. Power supply 510 may be an example of the corresponding components of the same name described with reference to FIGS. 3, 4, and 6.

MCU 530 may be an example of a component of UPS system 505. MCU 530 may be an example of the corresponding components of the same name described with reference to FIGS. 3, 4, and 6.

Battery management unit 535 may be an example of a component of UPS system 505. Battery management unit 535 may be an example of the corresponding components of the same name described with reference to FIGS. 3, 4, and 6. Battery 540 may be an example of a component of UPS system 505. Battery 540 may be an example of the corresponding components of the same name described with reference to FIGS. 3, 4, and 6.

Communication unit 545 may be an example of a component of UPS system 505; transmit the power usage data to a server or data storage unit; and receive an energy usage configuration based at least in part on transmitting the power usage data. Communication unit 545 may be an example of the corresponding components of the same name described with reference to FIGS. 3, 4, and 6.

Motion sensing unit 555 may be an example of a component of UPS system 505. Motion sensing unit 555 may be an example of the corresponding components of the same name described with reference to FIGS. 3, 4, and 6. Lighting unit 550 may be an example of a component of UPS system 505. Lighting unit 555 may be an example of the corresponding components of the same name described with reference to FIGS. 3, 4, and 6.

Multi-function button 560 may be an example of the corresponding components of the same name described with reference to FIGS. 3, 4, and 6. Indicator 565 may be an example of the corresponding components of the same name described with reference to FIGS. 3, 4, and 6.

Power receptacle 568 may be an example of a component of UPS system 505. In some cases, the power receptacle 568 comprises a NEMA 5-15 power receptacle 568. In some cases, the power receptacle 568 comprises a NEMA 5-15 power receptacle 568. Receptacle connector 569 may be an example of a component of UPS system 505. In some cases, the receptacle connector 569 comprises a NEMA certified connector. Electrical box 570 may be an example of a component of UPS system 505. In some cases, the electrical box 570 comprises an NEC article 314 compliant box. Electrical box 570 may enable UPS system 505 to be installed in a wall in place of a standard wall outlet.

Figure 6:
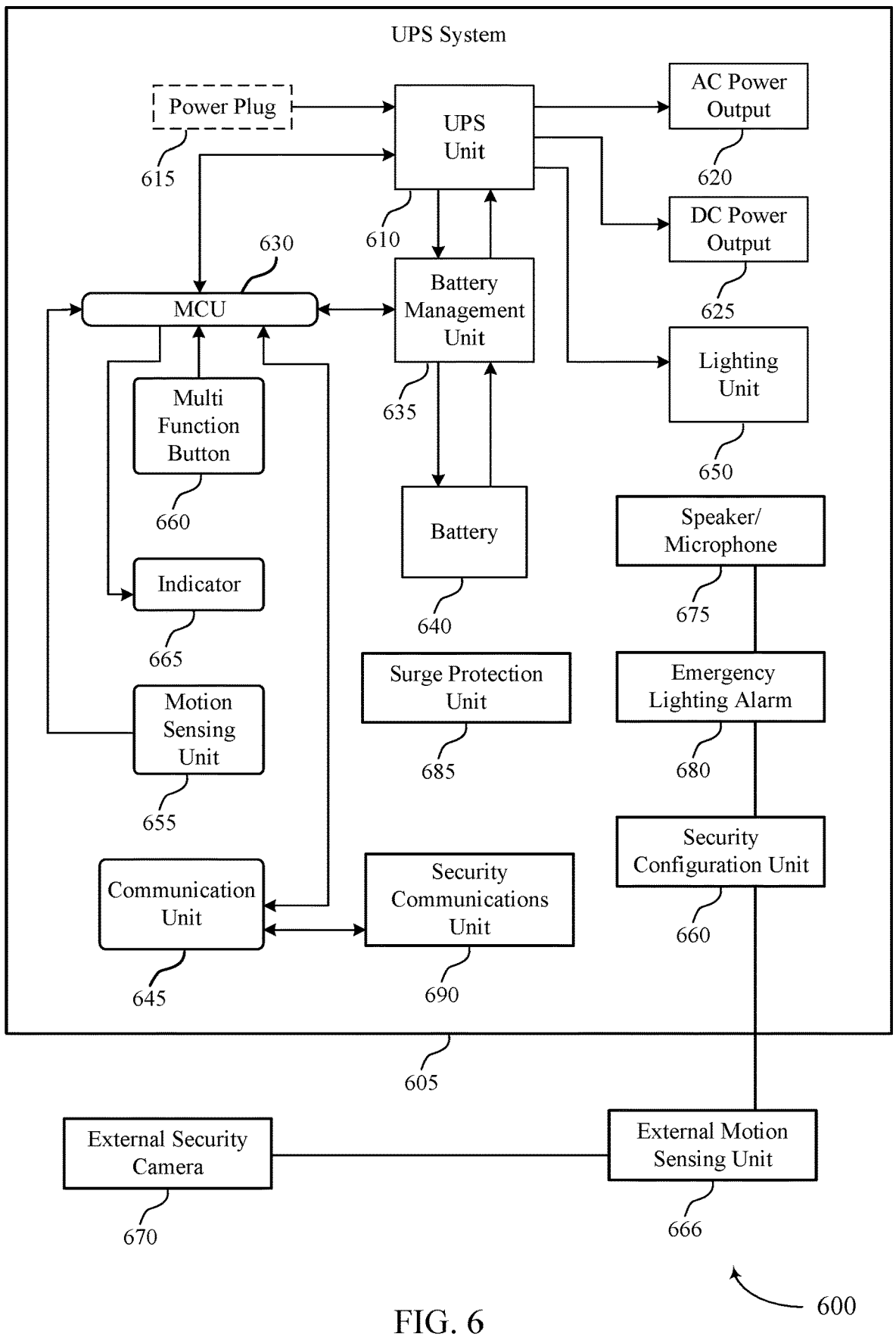

FIG. 6 shows a diagram 600 that supports managing a power system in accordance with aspects of the present disclosure. Diagram 600 may include UPS system 605. UPS system 605 may be an example of the corresponding components of the same name described with reference to FIGS. 3, 4, and 5. In some examples, UPS system 605 may include the following components: power supply 610, power plug 615, AC power output 620, DC power output 625, MCU 630, battery management unit 635, battery 640, communication unit 645, motion sensing unit 655, lighting unit 650, multi-function button 660, indicator 665, security configuration unit 660, external motion sensing unit 666, external security camera 670, speaker/microphone 675, lighting alarm 680, surge protection unit 685, and security communications unit 690. UPS system 605 may be a plug-in unit or an in-wall unit as described above with reference to FIGS. 3 through 5.

Power supply 610 may be an example of a component of UPS system 605. Power supply 610 may be an example of the corresponding components of the same name described with reference to FIGS. 3, 4, and 5. Power plug 615 may be an example of a component of UPS system 605. Power plug 615 may be an example of the corresponding components of the same name described with reference to FIGS. 3, 4, and 5.

MCU 630 may be an example of a component of UPS system 605. MCU 630 may be an example of the corresponding components of the same name described with reference to FIGS. 3, 4, and 5.

Battery management unit 635 may be an example of a component of UPS system 605. Battery management unit 635 may be an example of the corresponding components of the same name described with reference to FIGS. 3, 4, and 5. Battery 640 may be an example of a component of UPS system 605. Battery 640 may be an example of the corresponding components of the same name described with reference to FIGS. 3, 4, and 5.

Communication unit 645 may be an example of a component of UPS system 605; transmit the power usage data to a server or data storage unit; and receive an energy usage configuration based at least in part on transmitting the power usage data. Communication unit 645 may be an example of the corresponding components of the same name described with reference to FIGS. 3, 4, and 5.

Motion sensing unit 655 may be an example of a component of UPS system 605. Motion sensing unit 655 may be an example of the corresponding components of the same name described with reference to FIGS. 3, 4, and 5. Lighting unit 650 may be an example of a component of UPS system 605. Lighting unit 650 may be an example of the corresponding components of the same name described with reference to FIGS. 3, 4, and 5.

Multi-function button 660 may be an example of the corresponding components of the same name described with reference to FIGS. 3, 4, and 5. Indicator 665 may be an example of the corresponding components of the same name described with reference to FIGS. 3, 4, and 5.

Security configuration unit 660 may be an example of a component of UPS system 605. In some cases, the security configuration unit 660 is configurable for a plurality of modes including an away mode, a present mode, a night mode, a daytime mode, a pet mode or any combination thereof. In some cases, the away mode comprises a motion sensing alert function. In some cases, the night mode comprises an audible alarm function.

External motion sensing unit 666 may be an example of a component of UPS system 605 connected to security configuration unit 660. External security camera 670 may be an example of a component of UPS system 605 connected to security configuration unit 660. Security communications unit 690 may be an example of a component operable to communicate with an external security service connected to security configuration unit 660.

Surge protection unit 685 may be an example of a component of UPS system 605. In addition to surge protection unit 685, UPS system 605 may include a power loss protection unit, a brownout protection unit, or other power management units (not shown).

Figure 7:
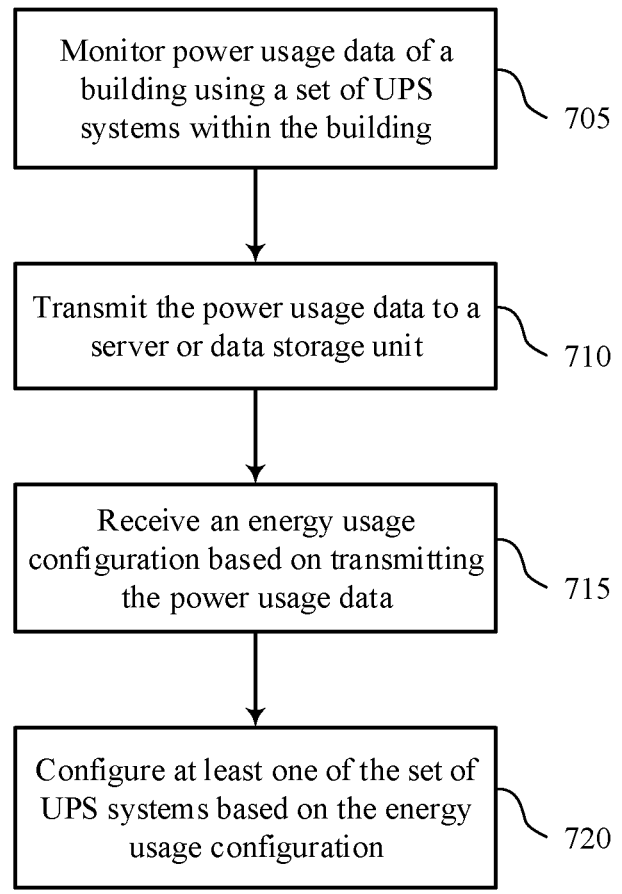
FIGS. 7 through 9 show flowcharts that support managing a power system in accordance with aspects of the present disclosure.

FIG. 7 shows a flowchart 700 that supports managing a power system in accordance with aspects of the present disclosure. In some examples, a system or apparatus may execute a set of codes to control the functional elements of the device to perform the described functions. Additionally or alternatively, the system or apparatus may perform aspects of the functions described below using special-purpose hardware.

At block 705 the system or apparatus may monitor power usage data of a building using a plurality of UPS systems within the building. The operations of this block may be performed according to the methods and processes described in the present disclosure. For example, the operations of this block may be composed of various substeps, or may be performed in conjunction with other operations described herein. In certain examples, aspects of the described operations may be performed by a power usage monitoring unit as described with reference to FIG. 2.

At block 710 the system or apparatus may transmit the power usage data to a server or data storage unit. The operations of this block may be performed according to the methods and processes described in the present disclosure. For example, the operations of this block may be composed of various substeps, or may be performed in conjunction with other operations described herein. In certain examples, aspects of the described operations may be performed by a communication unit as described with reference to FIGS. 3, 4, 5, and 6.

At block 715 the system or apparatus may receive an energy usage configuration based at least in part on transmitting the power usage data. The operations of this block may be performed according to the methods and processes described in the present disclosure. For example, the operations of this block may be composed of various substeps, or may be performed in conjunction with other operations described herein. In certain examples, aspects of the described operations may be performed by a communication unit as described with reference to FIGS. 3, 4, 5, and 6.

At block 720 the system or apparatus may configure at least one of the plurality of UPS systems based on the energy usage configuration. The operations of this block may be performed according to the methods and processes described in the present disclosure. For example, the operations of this block may be composed of various substeps, or may be performed in conjunction with other operations described herein. In certain examples, aspects of the described operations may be performed by an energy optimization unit.

Figure 8:
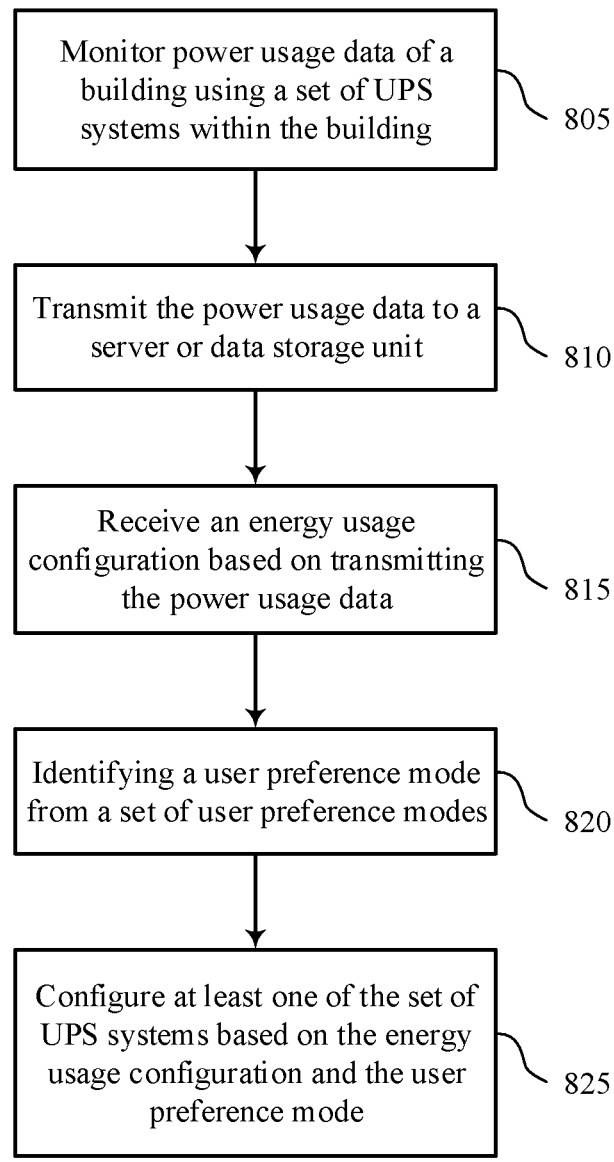

FIG. 8 shows a flowchart 800 that supports managing a power system in accordance with aspects of the present disclosure. In some examples, a system or apparatus may execute a set of codes to control the functional elements of the device to perform the described functions. Additionally or alternatively, the system or apparatus may perform aspects of the functions described below using special-purpose hardware.

At block 805 the system or apparatus may monitor power usage data of a building using a plurality of UPS systems within the building. The operations of this block may be performed according to the methods and processes described in the present disclosure. For example, the operations of this block may be composed of various substeps, or may be performed in conjunction with other operations described herein. In certain examples, aspects of the described operations may be performed by a power usage monitoring unit as described with reference to FIG. 2.

At block 810 the system or apparatus may transmit the power usage data to a server or data storage unit. The operations of this block may be performed according to the methods and processes described in the present disclosure. For example, the operations of this block may be composed of various sub steps, or may be performed in conjunction with other operations described herein. In certain examples, aspects of the described operations may be performed by a communication unit as described with reference to FIGS. 3, 4, 5, and 6.

At block 815 the system or apparatus may receive an energy usage configuration based at least in part on transmitting the power usage data. The operations of this block may be performed according to the methods and processes described in the present disclosure. For example, the operations of this block may be composed of various substeps, or may be performed in conjunction with other operations described herein. In certain examples, aspects of the described operations may be performed by a communication unit as described with reference to FIGS. 3, 4, 5, and 6.

At block 820 the system or apparatus may identify a user preference mode from a plurality of user preference modes. The operations of this block may be performed according to the methods and processes described in the present disclosure. For example, the operations of this block may be composed of various substeps, or may be performed in conjunction with other operations described herein. In certain examples, aspects of the described operations may be performed by an energy optimization unit as described with reference to FIG. 2.

At block 825 the system or apparatus may configure at least one of the plurality of UPS systems based on the energy usage configuration and the user preference mode. The operations of this block may be performed according to the methods and processes described in the present disclosure. For example, the operations of this block may be composed of various substeps, or may be performed in conjunction with other operations described herein. In certain examples, aspects of the described operations may be performed by an energy optimization unit.

Figure 9:
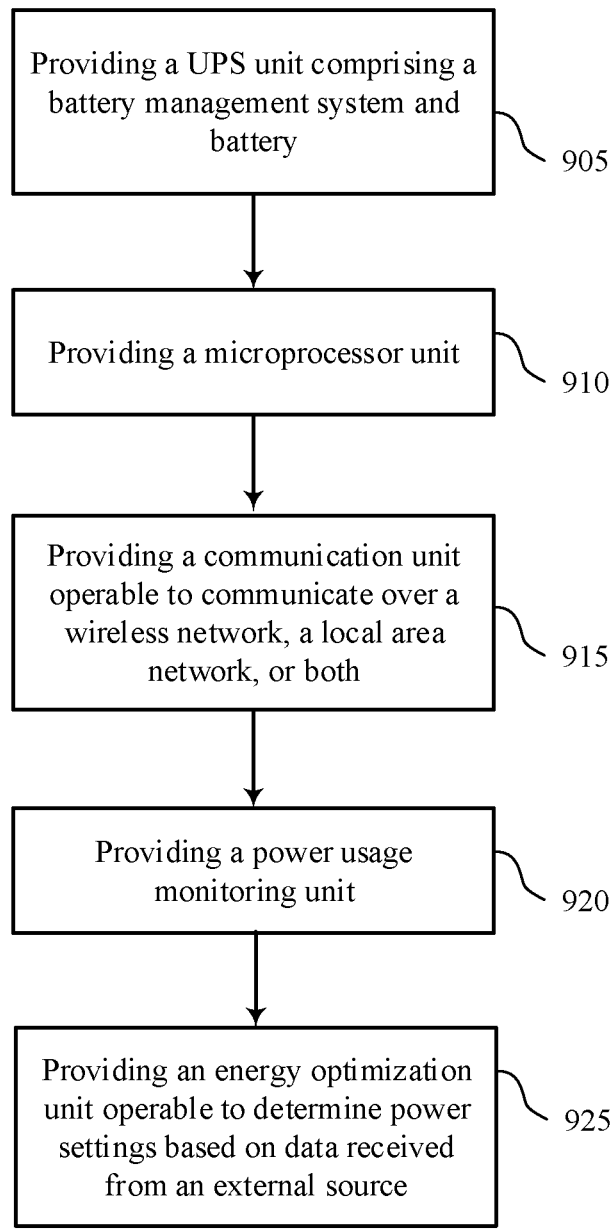

FIG. 9 shows a flowchart 900 that supports manufacturing a device for managing a power system in accordance with aspects of the present disclosure. In some examples, the steps may be performed manually. Additionally or alternative, a system or apparatus may execute a set of codes to control the functional elements of a manufacturing system to perform the described functions. The operations of each block may be performed according to the methods and processes described in the present disclosure. For example, the operations of this block may be composed of various substeps, or may be performed in conjunction with other operations described herein.

At block 905 a manufacturing system may provide a UPS unit comprising a battery management system and battery.

At block 910 the manufacturing system may provide a microprocessor unit.

At block 915 the manufacturing system may provide a communication unit operable to communicate over a wireless network, a local area network, or both.

At block 920 the manufacturing system may provide a power usage monitoring unit.

At block 925 the manufacturing system may provide an energy optimization unit operable to determine power settings based on data received from an external source.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a DSP, an ASIC, an FPGA or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise Random Access Memory (RAM), Read-only Memory (ROM), electrically erasable programmable read only memory (EEPROM), compact disk (CD) ROM or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, digital subscriber line (DSL), or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. An apparatus for power management, comprising:
an uninterrupted power supply (UPS) unit comprising a battery management system, a battery, and a power output unit configured to electrically detachably couple to a separate electronic device and to supply backup power to the separate electronic device based on power settings, the UPS unit configured to couple to and to receive power from a standard power outlet of a building;
a microprocessor unit (MCU);
a communication unit operable to communicate over a wireless network, a local area network, or both;
a power usage monitoring unit configured to:
identify usage patterns of consumed power within the apparatus; and
machine learn a configuration from the usage patterns; and
an energy optimization unit operable to determine the power settings for supplying the backup power to the separate electronic device based on the configuration.

2. The apparatus of claim 1, wherein:
the energy optimization unit is configured to receive data from an external source, the data comprising time varying pricing data, tiered pricing data, power usage history, and user behavior data.

3. The apparatus of claim 1, further comprising:
a power configuration unit operable to modify a power intake from the standard power outlet of the building and a power output of the power output unit based at least in part on the power settings determined by the energy optimization unit.

4. The apparatus of claim 1, further comprising:
a security configuration unit configurable for a plurality of modes including an away mode, a present mode, a night mode, a daytime mode, a pet mode or any combination thereof.

5. The apparatus of claim 1, further comprising:
an electrical box configured to secure the apparatus within an interior of a wall.

6. The apparatus of claim 1, further comprising:
a power plug configured to draw the power from and secure the apparatus to a standard wall power receptacle of the building.

7. The apparatus of claim 1, further comprising:
a motion sensing unit, a lighting unit, an electrical extension cord, an AC power output, an AC to AC power supply, a DC power output, a DC to DC power supply, an AC to DC power supply, a power selection unit, a microphone, a speaker unit, an energy optimization unit, an inter-UPS communication unit, a light source, a powerline sensing unit, a powerline communications unit, a temperature sensor, a humidity sensor, an HVAC communications component, a universal serial bus (USB) port, a housing, a faceplate, a power receptacle, or any combination thereof.

8. The apparatus of claim 1, further comprising:
a power selection unit configured to prioritize between alternating current (AC) power and direct current (DC) power based on the configuration.

9. A system for power management, comprising:
a plurality of power supply and control units in electronic communication with each other, the plurality of power supply and control units configured to be electrically connected to a plurality of appliances and to provide the plurality of appliances with power, the plurality of power supply and control units configured to selectively provide the power from an electrical grid or a backup battery;

a power usage monitoring unit configured to:
 identify usage patterns of the power consumed by the plurality of appliances; and
 machine learn an energy usage configuration from the usage patterns; and
an energy optimization unit operable to determine an energy storage and discharge schedule for each of the plurality of power supply and control units based on the energy usage configuration.

10. The system of claim 9, wherein:
each of the plurality of power supply and control units is connected to a power outlet, and is in electronic communication with the other power supply and control units via the power outlet.

11. The system of claim 9, wherein:
each of the power supply and control units comprises a communication unit that is capable of communication with other power supply and control units.

12. The system of claim 9, wherein:
the energy optimization unit is configurable according to a plurality of user preference modes, the plurality of user preference modes including a cost saving mode, a user comfort mode, a maximum power availability mode, or any combination thereof.

13. The system of claim 9, further comprising:
a power selection unit configured to prioritize between alternating current (AC) power and direct current (DC) power based on the energy usage configuration.

14. The system of claim 9, wherein:
the plurality of power supply and control units are interconnected and comprises an on-premises distributed power backup system configured to provide back-up power or offset power.

15. A system for power management, the system configured to:
monitor power usage data of a plurality of appliances within a building using a plurality of UPS systems within the building, the plurality of appliances being respectively electrically connected to the plurality of UPS systems to receive power, the plurality of UPS systems configured to selectively provide the power from an electrical grid or a backup battery, the plurality of UPS systems including a first UPS system and a second UPS system;
identify usage patterns of the power consumed by the plurality of appliances;
transmit the power usage data to a server;
machine learn, at the server, an energy usage configuration from the usage patterns;
receive the energy usage configuration; and
configure an energy storage and discharge schedule of the first UPS system and the second UPS system based on the energy usage configuration.

16. The system of claim 15, wherein:
the energy usage configuration is based on time varying energy price data, tiered energy price data, and user behavioral patterns.

17. The system of claim 15, wherein the system is further configured to:
identify weather information, wherein the configuring is based on the weather information.

18. The system of claim 15, wherein the system is further configured to:
identify a user preference mode from a plurality of user preference modes, the plurality of user preference modes including a cost saving mode, a user comfort mode, a maximum power availability mode, or any combination thereof, wherein the configuring is based on the user preference mode.

19. The system of claim 15, wherein:
the plurality of UPS systems is respectively plugged into a plurality of power outlets that are in electronic communication with each other; and
the plurality of UPS systems is interconnected via the plurality of power outlets and comprises an on-premises distributed power backup system configured to provide back-up power or offset power.

* * * * *